July 6, 1948.  W. D. WILLIAMS  2,444,797
MAGNETIC COUPLING
Filed Jan. 28, 1947
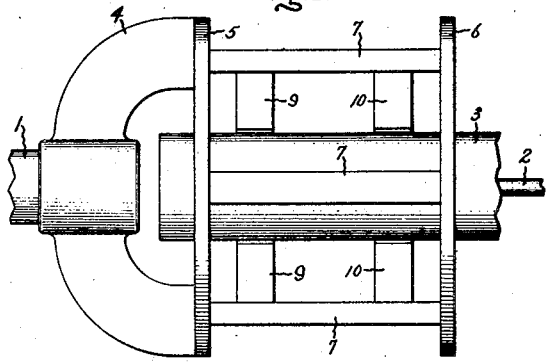
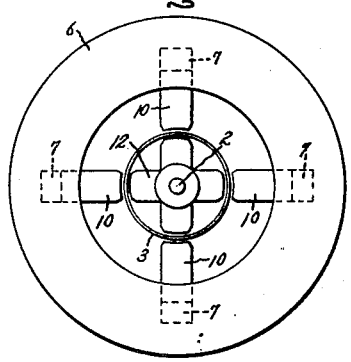
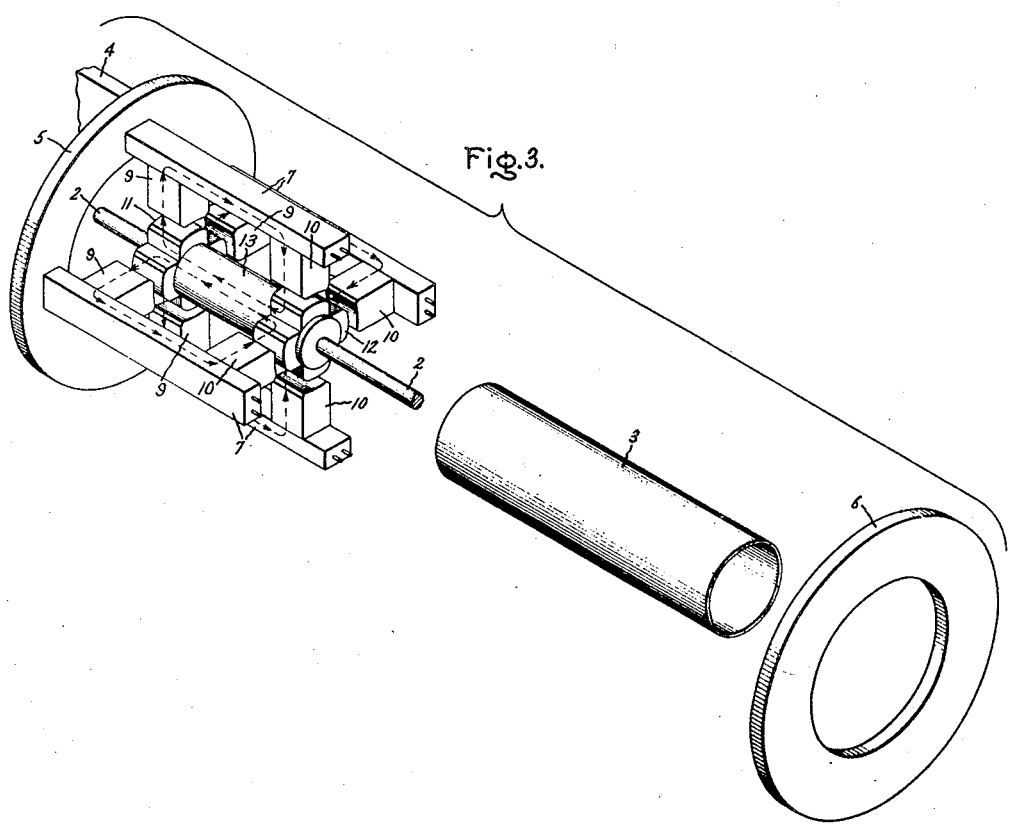
Inventor:
William D. Williams,
by Claude A. Mott
His Attorney.

Patented July 6, 1948

2,444,797

UNITED STATES PATENT OFFICE 2,444,797

MAGNETIC COUPLING

William D. Williams, Scotia, N. Y., assignor to General Electric Company, a corporation of New York Application January 28, 1947, Serial No. 724,791

4 Claims. (Cl. 172—284)

My invention relates to magnetic couplings, or clutching means, between rotating shafts. The invention is particularly applicable wherever it is desired to make driving connection between rotating shafts which must be separated by a fluid impervious diaphragm or the like.

In certain applications where one member of a rotating system, such as a gas or liquid pump or impeller, must run in an explosive or inflammable atmosphere, it is undesirable to provide electromagnetic coupling means between the driving and driven members because of the danger of electric sparks and consequent explosion in the event of a fluid leak. For such application, permanent magnet couplings are preferable. On the other hand, because of demagnetizing effects and inherent limitations in available magnetomotive force, permanent magnet couplings present some problems not present where electromagnetic couplings may be used. Permanent magnet couplings are particularly difficult of application where the fluid medium is under high pressure. For high pressure operation, the diaphragm must be relatively thick and, since the thickness must be increased as the diameter of the diaphragm is increased, it is not always possible to attain increased torque simply by placing the magnets at a greater radius.

I have found that very high torque may be obtained by using a cylindrical diaphragm in conjunction with radially disposed permanent magnets outside the diaphragm and a salient pole magnetizable rotor within the diaphragm. With such a structure torque may be increased by adding coupling units axially without increasing diaphragm diameter.

Accordingly, it is a general object of my invention to provide a new and improved permanent magnet clutch or coupling between rotatable members.

It is a further object of my invention to provide a new and novel permanent magnet coupling arranged to drive through a cylindrical diaphragm and having a structure which is readily multiplied axially of the diaphragm thereby to increase the driving torque without increasing the diaphragm diameter.

It is a more particular object of my invention to provide a new and novel permanent magnet clutch structure in which the various clutch elements may be individually and easily removed without any appreciable loss of magnetic strength.

My invention itself will be more fully understood and its various objects and advantages further appreciated by referring now to the following detailed specification taken in conjunction with the accompanying drawing, in which Figs. 1 and 2 are side and end views, respectively, of a magnetic coupling element embodying my invention, and Fig. 3 is an exploded perspective view of the coupling shown at Figs. 1 and 2.

Referring now to the drawing, I have shown a magnetic coupling comprising a pair of rotatable shafts 1 and 2, disposed in alignment and journaled in suitable bearings, not shown. Either shaft may be driven from an external source of power, the other shaft being magnetomotively coupled to it as will be described hereinafter. The shaft 2 is axially disposed within a cylindrical, fluid-impervious casing or diaphragm 3. The shaft 1 is in axial alignment with the shaft 2, but is disposed outside the diaphragm 3.

A spider 4 mounted upon the shaft 1 carries a rotatable permanent magnetic structure disposed between a pair of axially spaced end rings 5 and 6. The end rings 5 and 6 preferably formed of a non-magnetizable material, such as brass, and are connected together by a plurality of magnetizable bars or yokes 7 disposed around the rings 5 and 6 in parallel spaced relation with respect to the axis of cylindrical diaphragm 3. Extending radially, inwardly from each yoke 7, and in axial spaced relation, are a pair of permanent magnets 9 and 10. The magnets 9 and 10 are mounted on the yoke 7 with opposite poles of each pair of magnets adjacent the yoke. Thus the magnetomotive forces of each pair of magnets are additive around a loop including the associated yoke 7.

For the permanent magnet 9 and 10, I prefer to use a permanent magnet material having a relatively high coercive force in relation to its size. A suitable material for this purpose is an alloy comprising from 6 to 15% aluminum, 12 to 30% nickel, about 5% copper, is desired, and the remainder iron, such as described and claimed in Patents 1,947,274 and 1,968,569 issued on February 13, July 31, 1934, respectively, to William E. Ruder.

Within the cylindrical diaphragm or casing 3 and mounted upon the rotatable shaft 2 is a salient pole rotor comprising a pair of magnetizable armatures 11 and 12. The armatures 11 and 12 are formed of a suitable magnetizable material, such as soft iron or the like, and are mounted upon the shaft 2 in axial spaced relation, so that the armature 11 rotates between the poles of the magnet 9 and the armature 12 rotates between the poles of the magnet 10. Each armature is provided with a number of salient poles equal to the number of magnets in the magnet system within which it rotates. For example, in the illustrated embodiment of the invention, I have shown four magnets 9 and four magnets 10, so that each armature 11 and 12 is provided with four salient poles.

To complete the magnetic flux path for the magnets 9 and 10, the rotor comprises also a cylindrical magnetizable yoke 13 mounted on the shaft 2 between the armatures 11 and 12. The complete magnetic flux path for each pair of magnets 9 and 10 is illustrated in broken lines at Fig. 3. It will be observed that each flux path passes through one pair of magnets 9 and 10, through the associated outer yoke 7, through the armatures 11 and 12 and through the axial yoke 13.

In operation, either the external magnets 9 and 10 or the armatures 11 and 12 may be driven from an external source of power. In either case, the magnetomotive force between the magnets and the armatures supplies to the other rotatable member of the system a driving torque having a predetermined maximum value determined by the geometry of the magnet system and the intensity of magnetization of the magnets 9 and 10. I have found that the available torque may be increased by tapering the adjacent poles of the armatures 11 and 12 and the cooperating magnets 9 and 10. I have found also that for any particular magnet system, a predetermined amount of taper provides a maximum available torque. That is, as the pole taper is increased from zero, the available torque passes through a maximum value. The optimum pole taper is most easily determined experimentally for any particular magnet system.

Certain objects and advantages of my invention will now appear more clearly in view of the foregoing description of one illustrative embodiment thereof. First, by placing the magnet and armature poles radially adjacent each other, so that a cylindrical diaphragm may be interposed therebetween, the drive is made particularly adaptable for high pressure fluid systems. With a cylindrical diaphragm, the driving torque may be increased simply by duplicating driving units axially of the shaft without increasing the diameter of and thus weakening the diaphragm. Thus, the unit shown in the drawing may be duplicated along the shaft, or additional half units may be added with the magnets on each yoke 7 alternately oppositely oriented. Secondly, by mounting the permanent magnets at the exterior of the diaphragm or casing 3, a relatively high torque may be obtained with a small diameter rotor, by reason of the fact that the length and magnetomotive force of the magnets 9 and 10 may be increased without increasing the diameter of the rotor. Moreover, by mounting each pair or group of magnets 9 and 10 upon a separate axially extending yoke 7, each yoke 7 and its attached magnets may be separately removed radially or axially without the necessity of endwise removal of the entire magnet system when the repair or replacement of any part is necessary. In this connection, it may be noted also that by arranging the magnets 9 and 10 in pairs spaced axially along the shaft and connected by the yoke 7, each pair of magnets 9 and 10 when removed with its yoke, remains in a magnetic system of sufficiently small reluctance that the magnets do not lose any appreciable portion of their magnetization by the removal. To further insure retention of magnetic strength it is, of course, easily possible to slip an iron keeper between the poles of any pair of magnets as soon as it is moved slightly away from the diaphragm 3.

Each pair of magnets 9 and 10, along with the permanently attached yoke 7, forms a substantially U-shaped permanently magnetized structure. It will, of course, be understood that without departing from the spirit and scope of my invention, this U-shaped structure may be formed entirely of permanent magnet material and permanently magnetized for its entire length. I prefer, however, to utilize permanent magnet material only in the legs of the U-shaped structure and a soft iron magnetizable material for the bight or yoke portion, since the reluctance of soft iron is considerably less than that of permanent magnet material.

While I have described only a preferred embodiment of my invention by way of illustration, many modifications will occur to those skilled in the art and I, therefore, wish to have it understood that I intend in the appended claims, to cover all such modifications that fall within the true spirit and scope of my invention.

What I claim as new and desire to secure by Letters Patent of the United States is:

1. A magnetic coupling for transmitting rotary motion through a stationary cylindrical fluid-impervious diaphragm comprising, driving and driven shafts in alignment with the axis of said cylindrical diaphragm, a plurality of substantially U-shaped members permanently magnetized for at least a portion of their length and mounted in angularly spaced relation on one of said shafts with the two legs of each member radially disposed and in axial spaced relation adjacent the exterior of said diaphragm, a pair of axially spaced armatures mounted upon the other of said shafts and positioned within said diaphragm, each said armature comprising a plurality of angularly spaced radially disposed salient poles of magnetizable material, and a yoke of magnetizable material mounted upon said other shaft between said armatures.

2. A magnetic coupling for transmitting rotary motion through a stationary cylindrical fluid-impervious diaphragm comprising, driving and driven shafts in alignment with the axis of said cylindrical diaphragm, a plurality of permanent magnetic structures mounted upon one of said shafts in angularly spaced relation adjacent the exterior of said diaphragm, each said structure comprising at least one substantially U-shaped element permanently magnetized for at least a portion of its length and having spaced apart legs disposed radially of said one shaft and in axially spaced relation, a pair of axially spaced armatures mounted upon the other of said shafts and positioned with said diaphragm, each said armature comprising a plurality of angularly spaced radially disposed salient poles of magnetizable material, and a yoke of magnetizable material mounted upon said other shaft between said armatures.

3. A magnetic coupling for transmitting rotary motion through a stationary cylindrical fluid-impervious diaphragm comprising, driving and driven shafts in alignment with the axis of said cylindrical diaphragm, a plurality of permanent magnet structures mounted upon one of said shafts in angularly spaced relation adjacent the exterior of said diaphragm, each said structure comprising at least one pair of radially disposed axially spaced permanent magnets and a magnetizable yoke parallel to said axis connecting opposite poles of each said pair of magnets, a pair of axially spaced armatures mounted upon the other of said shafts and positioned within said diaphragm, each said armature comprising a plurality of angularly spaced radially disposed salient poles of magnetizable material, and a yoke of magnetizable material mounted upon said other shaft between said armatures.

4. A magnetic coupling for transmitting rotary motion through a stationary cylindrical fluid-impervious diaphragm comprising, driving and driven shafts in alignment with the axis of said cylindrical diaphragm, a plurality of magnetizable yokes mounted upon one of said shafts in and extending axially of said shaft in substantially parallel angularly spaced relation, a group of radially disposed axially spaced permanent magnets mounted upon each said yoke with their inner poles adjacent the exterior of said diaphragm, adjacent magnets of each said group of magnets being oppositely disposed so that their magnetomotive forces are additive through the supporting yoke, a pair of axially spaced armatures mounted upon the other of said shafts and positioned within said diaphragm, each said armature comprising a plurality of angularly spaced radially disposed salient poles of magnetizable material, and the yoke of magnetizable material mounted upon said other shaft between said armatures.

WILLIAM D. WILLIAMS.

REFERENCES CITED

The following references are of record in the file of this patent:

UNITED STATES PATENTS

| Number | Name | Date |
| --- | --- | --- |
| 280,322 | Nash | June 26, 1883 |
| 1,608,231 | Bradley | Nov. 23, 1926 |
| 1,911,960 | Lipman | May 30, 1933 |